C. Neumann
Hoop Skirt.
№ 991 Reissued Jun. 26. 1860.
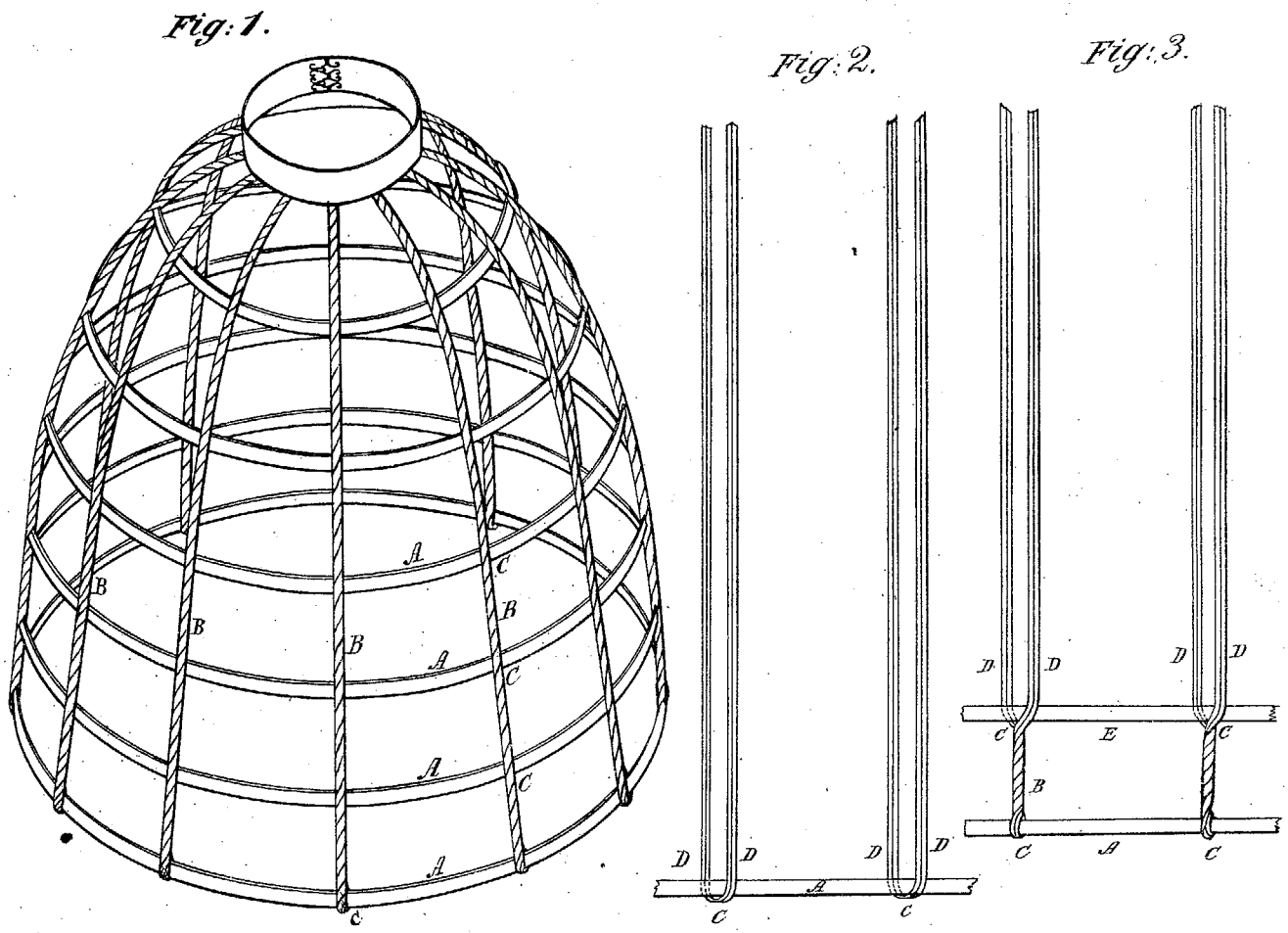
Witnesses.
Elkan Levinger.
A. Sidney Doane
Inventor.
Caesar Neumann

UNITED STATES PATENT OFFICE.

CÆSAR NEUMANN, OF NEW YORK, N. Y.

IMPROVEMENT IN SKELETON HOOP-SKIRTS.

Specification forming part of Letters Patent No. 25,976, dated November 1, 1859; Reissue No. 991, dated June 26, 1860.

*To all whom it may concern:*

Be it known that I, CÆSAR NEUMANN, of the city, county, and State of New York, have invented certain new and useful Improvements in Constructing Hoop Skirts, known as Skeleton Skirts; and I do hereby declare and ascertain my said invention, referring to the accompanying drawings, in which—

Figure 1 is a view of my improved skirts. Figs. 2 and 3 show a mode of manufacturing the same.

My improvement is for the purpose of cheapening the manufacture of this most important article of ladies' wearing-apparel. It supersedes the previously expensive modes of making skeleton skirts, in which tapes and like materials were combined with the hoops by means of metal clasps or fastenings, or by sewing said tapes to the covered springs, or by sewing loops in tapes to insert the springs or forming loops therein by the expensive process of weaving, all of which is avoided by my present process of substituting for said tapes or other like articles simple twisted cord, which can be made by hand; but I prefer to use machinery therefor. The cord used may be made either before it is combined with the hoops or at the time the hoops are being inserted, the hoops being inserted in a bight or loop in the cord, however, made to combine the two.

When the cord is made at the same time that the hoops are inserted, I proceed as follows: I take the ordinary spring-hoops used in skeleton skirts, however constructed, and first twisting a series of cords each of two or more strands twisted together, I then at the proper point for inserting a hoop form a bight or loop in each cord and insert the hoop into the bight. I then, by the back twist, form the cords beyond the hoop and fasten them. I then make cords of sufficient length to insert a second hoop, and so on until the skirt is complete, the cords and hoops being at sufficient distance apart to form the desired fabric, which will differ in the number of spring-hoops and cords according to the quality of the article manufactured.

This mode of connecting the spring-hoops of a skirt, it is obvious, admits of great rapidity of construction, and is much cheaper than the former systems of fastening by clasps, or by sewing or weaving in, thus combining a series of spring-hoops by means of a series of twisted cords, by which I form a cheap and substantial hoop-skirt.

Having thus fully described my improved manufacture, what I claim, and desire to secure by Letters Patent, is—

A skeleton skirt constructed as herein described.

CÆSAR NEUMANN.

Witnesses:
ALB. H. HOOK,
JULIUS HENIUS.